US 9,250,916 B2

(12) United States Patent
Fox et al.

(10) Patent No.: US 9,250,916 B2
(45) Date of Patent: Feb. 2, 2016

(54) CHAINING BETWEEN EXPOSED VECTOR PIPELINES

(71) Applicant: International Business Machines Corporation, Armonk, NY (US)

(72) Inventors: Thomas W. Fox, Hopewell Junction, NY (US); Bruce M. Fleischer, Bedford Hills, NY (US); Hans M. Jacobson, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 13/795,435

(22) Filed: Mar. 12, 2013

(65) Prior Publication Data

US 2014/0281386 A1 Sep. 18, 2014

(51) Int. Cl.
| | |
|---|---|
| *G06F 9/30* | (2006.01) |
| *G06F 9/40* | (2006.01) |
| *G06F 13/00* | (2006.01) |
| *G06F 9/38* | (2006.01) |

(52) U.S. Cl.
CPC .......... *G06F 9/3867* (2013.01); *G06F 9/30079* (2013.01)

(58) Field of Classification Search
None
See application file for complete search history.

(56) References Cited

U.S. PATENT DOCUMENTS

| | | | | |
|---|---|---|---|---|
| 6,076,154 | A * | 6/2000 | Van Eijndhoven | G06F 9/30149 712/206 |
| 7,080,235 | B1 * | 7/2006 | Weiss | G06F 9/3814 709/247 |
| 7,340,590 | B1 * | 3/2008 | Sugumar | G06F 9/30036 712/210 |
| 7,668,979 | B1 * | 2/2010 | Wentzlaff | G06F 13/4022 710/33 |
| 7,805,577 | B1 * | 9/2010 | Mattina | G06F 12/0817 711/119 |
| 2007/0083736 | A1 * | 4/2007 | Baktha | G06F 9/30174 712/215 |
| 2007/0174590 | A1 * | 7/2007 | Augusteijn | G06F 9/30072 712/218 |
| 2011/0185158 | A1 * | 7/2011 | Alexander | G06F 9/30043 712/204 |

* cited by examiner

*Primary Examiner* — Michael Sun
(74) *Attorney, Agent, or Firm* — Cantor Colburn LLP

(57) ABSTRACT

Embodiments include a method for chaining data in an exposed-pipeline processing element. The method includes separating a multiple instruction word into a first sub-instruction and a second sub-instruction, receiving the first sub-instruction and the second sub-instruction in the exposed-pipeline processing element. The method also includes issuing the first sub-instruction at a first time, issuing the second sub-instruction at a second time different than the first time, the second time being offset to account for a dependency of the second sub-instruction on a first result from the first sub-instruction, the first pipeline performing the first sub-instruction at a first clock cycle and communicating the first result from performing the first sub-instruction to a chaining bus coupled to the first pipeline and a second pipeline, the communicating at a second clock cycle subsequent to the first clock cycle that corresponds to a total number of latch pipeline stages in the first pipeline.

12 Claims, 8 Drawing Sheets

CHAINING BETWEEN EXPOSED VECTOR PIPELINES

BACKGROUND

The present invention relates generally to computer processing and memory, and more particularly to chaining between exposed vector pipelines.

Computer systems often require a considerable amount of high speed memory, such as random access memory (RAM), to hold information (e.g., data and programs) when a computer is powered and operational. Memory device demands have continued to grow as computer systems have increased in performance and complexity.

Communication from a main processor to locations on memory devices can involve relatively long data access times and latency. The time it takes for the main processor to access memory can be, for example, several hundred cycles, including time to realize the data is not in cache (for memory reads), time to traverse from a processor core of the main processor to I/O, across a module or other packaging, arbitration time to establish a channel to memory in a multi-processor/shared memory system, and time to get the data into or out of a memory cell.

Contemporary memory systems include vector processors that have capability to support multiple memory accesses in parallel. Supporting parallel memory accesses to multiple memory locations often leads to increased bandwidth in a memory system.

SUMMARY

Embodiments include a system and method for chaining data in an exposed-pipeline processing element. The method includes separating a multiple instruction word into a first sub-instruction and a second sub-instruction, receiving the first sub-instruction and the second sub-instruction in the exposed-pipeline processing element. The method also includes issuing the first sub-instruction at a first time, issuing the second sub-instruction at a second time different than the first time, the second time being offset to account for a dependency of the second sub-instruction on a first result from the first sub-instruction, the first pipeline performing the first sub-instruction at a first clock cycle and communicating the first result from performing the first sub-instruction to a chaining bus coupled to the first pipeline and a second pipeline, the communicating at a second clock cycle subsequent to the first clock cycle that corresponds to a total number of latch pipeline stages in the first pipeline, the first pipeline and second pipeline being located in separate register file spaces. The method includes the second pipeline receiving the second sub-instruction at the second clock cycle and performing the second sub-instruction at the second clock cycle, the performing based on receiving the first result via the chaining bus.

Additional exemplary embodiments include a system and method for chaining data in an exposed-pipeline processing element. The method includes receiving a multiple instruction word in an instruction buffer of the exposed-pipeline processing element, the multiple instruction word comprising a first sub-instruction and a second sub-instruction, a first pipeline receiving the first sub-instruction and a second pipeline receiving the second sub-instruction, the first pipeline and second pipeline being located in separate register file spaces. The method also includes the first pipeline performing the first sub-instruction at a first clock cycle, stalling execution of the second sub-instruction at the first clock cycle, the second sub-instruction being dependent on a first result from the first sub-instruction, the first pipeline communicating the first result from performing the first sub-instruction to a chaining bus coupled to the first pipeline and second pipeline, the communicating at a second clock cycle subsequent to the first clock cycle that corresponds to a total number of latch pipeline stages in the first pipeline and performing the second sub-instruction at the second clock cycle, the performing based on receiving the first result via the chaining bus.

DETAILED DESCRIPTION

Figure 1:
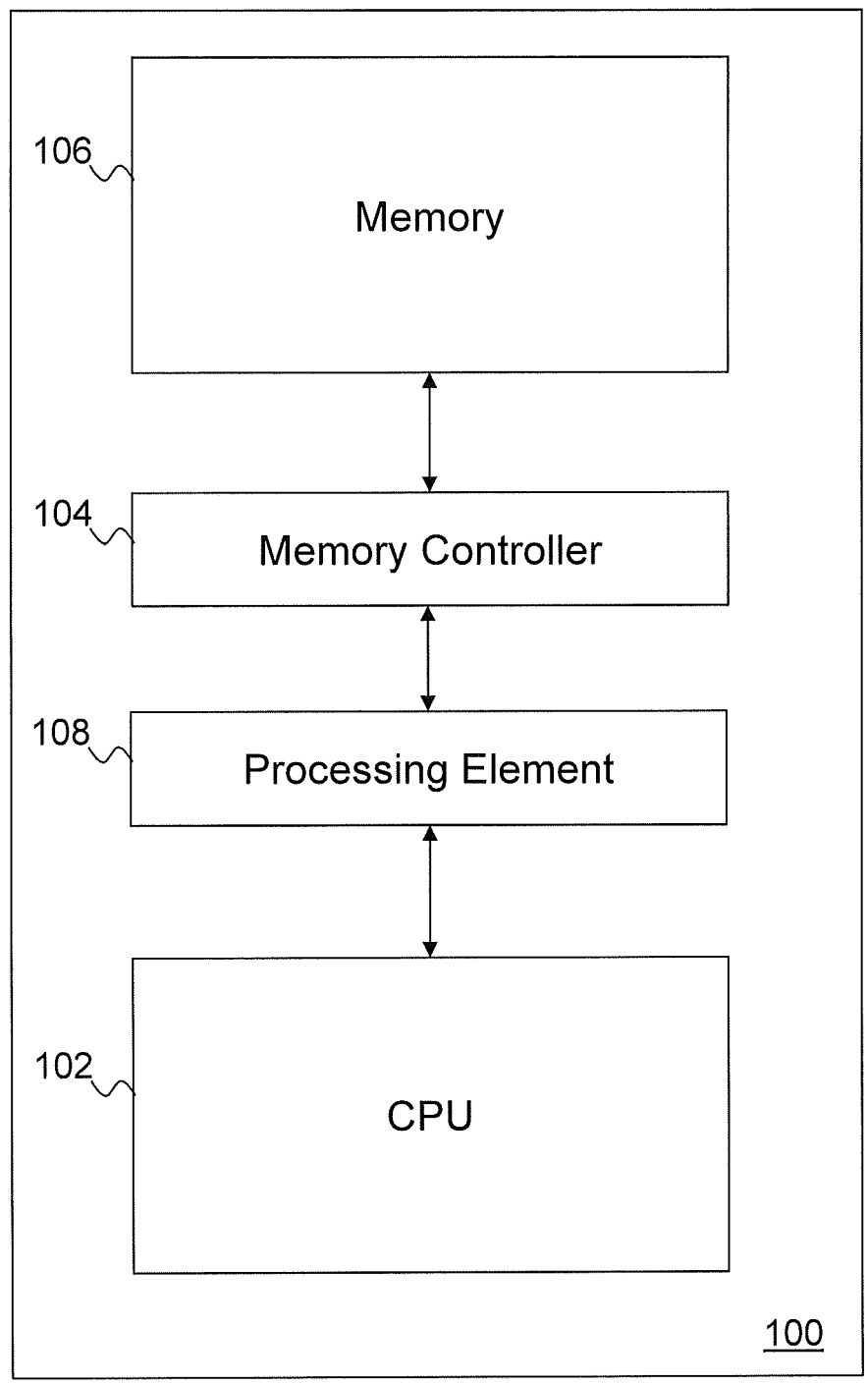
FIG. 1 illustrates a block diagram of a system for active memory in accordance with an embodiment.

An embodiment is directed to chaining between exposed vector pipelines by interlocking pipelines over a chaining bus such that a pipeline cannot start executing its instruction until all required results have arrived. In an embodiment, efficient exchange of result data between function units is provided in a horizontally micro-coded vector processor with compiler scheduled dependency distance without requiring additional instruction space. A compiler can breakup the horizontally microcoded instructions (also referred to as "multiple instruction word") to provide a delay in sub-instruction execution until all results are available for each sub-instruction. Embodiments do not require the instructions to be split into separate time slots to be able to account for the delay of the pipelines in producing the results to indicate when an instruction in a dependent pipeline can start using a chained result. In a processing element that includes multiple processing pipelines and supports chaining of a result from one pipeline to another without saving the result to a register, improvements in energy consumption per computation can be realized over conventional microprocessor designs. The processing element can provide access to the elements of vector registers through local element index counters. Each iteration of execution of a vector instruction is associated with an index pointing to indexed element of the vector register, where the indexed element is used for a particular iteration of the instruction execution. Exposing the pipeline sequence of the processing element enables a compiler or user to accommodate soft errors.

In exemplary embodiments, a pipeline dependent on a chained result from another pipeline is stalled until the result is available to be chained from the other pipeline. The stall is enabled by a set of bits in the instruction indicating what chained result buses the instruction have to wait for as its operands. Once all results needed by the instruction are marked valid on their chaining buses, the instruction can proceed. This embodiment of a stall protocol requires all instructions in the pipelines to start in the same cycle, operate in lockstep, and have the same latency in producing their result. Also required is a separate current instruction address register and a separate vector length counter for each sub-instruction of the horizontally micro-coded instruction to track its instruction address and index in the vector operation. A benefit from this type of stall protocol is that there is no need to break up the horizontally micro-coded vector instruction into multiple sub-instructions in order to account for the delay to produce the chained result, thus saving instruction buffer space.

In other embodiments, an interlock protocol is used to allow different latencies through the pipelines producing the results to be chained. However, the instructions must all be issued at the same time to allow the instruction that needs the chained results to set up the interlock before the results are produced. In this interlocking technique the producer pipelines must stall after they have produced their result until all results required by the instruction receiving the chained results have arrived at that instruction's pipeline. An advantage to using interlocked chaining is that pipelines with different latencies can be used, for example, to allow early bypasses, or to allow chaining of results from different types of instructions or pipelines that take a different number of cycles to finish, without having to perform a complex breakup of horizontally micro-coded vector instructions into sub-vectors with the correct offsets to time the arrival of chained data from the different pipelines. Breaking up the horizontally micro-coded vector instructions into sub-vectors can take up a lot of extra instruction buffer space in a horizontally micro-coded processing element. Interlocked chaining also allows the use of instructions or pipelines with unknown delays, such as, but not limited to, early production of results when detecting zero operands or short bit range operands. Another advantage to using an interlocked chaining protocol compare to stall chaining protocol is that the sub-instructions from the next horizontally micro-coded instruction belonging to non-stalled pipelines can be read out and executed, thus eliminating the bubble overhead of a stalled chaining protocol.

Chaining between exposed pipeline processing elements can be implemented in an active memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements and vaults on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a real address for identifying the location in the memory 106 to which the data will be written. The memory controller 104 stores data at a real address within the memory 106. The computer processor 102 can map the virtual address to a real address in the memory 106 when storing or retrieving data. The real address for a given virtual address may change each time data in the memory 106 is modified.

In an embodiment, the processing element 108 is in communication with the computer processor 102 and receives a command from the computer processor 102. The command may correspond to instructions stored in the memory 106 to perform write requests for data to be written to the memory 106. The command may also include a virtual address for identifying the location in the memory 106 to which the data will be written. The memory controller 104 and/or processing element 108 stores data at a real address within the memory 106. In an embodiment, the processing element 108 maps the virtual address to a real address in the memory 106 when storing or retrieving data. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
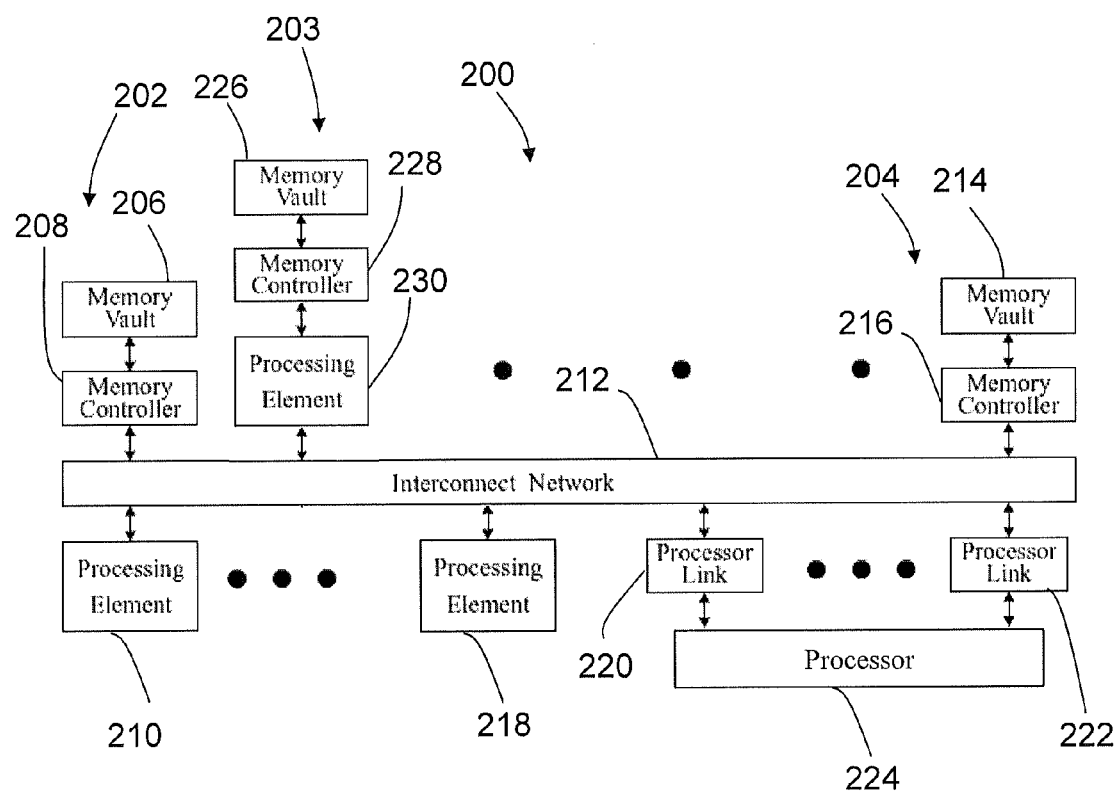
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
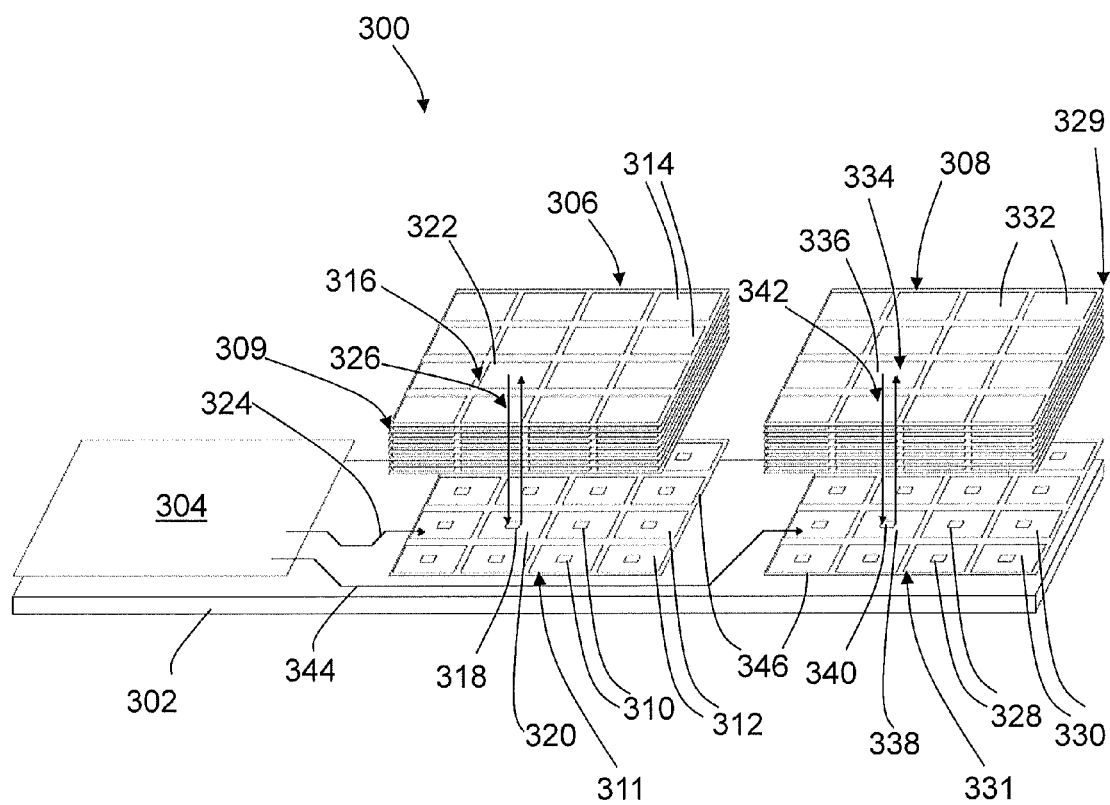
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
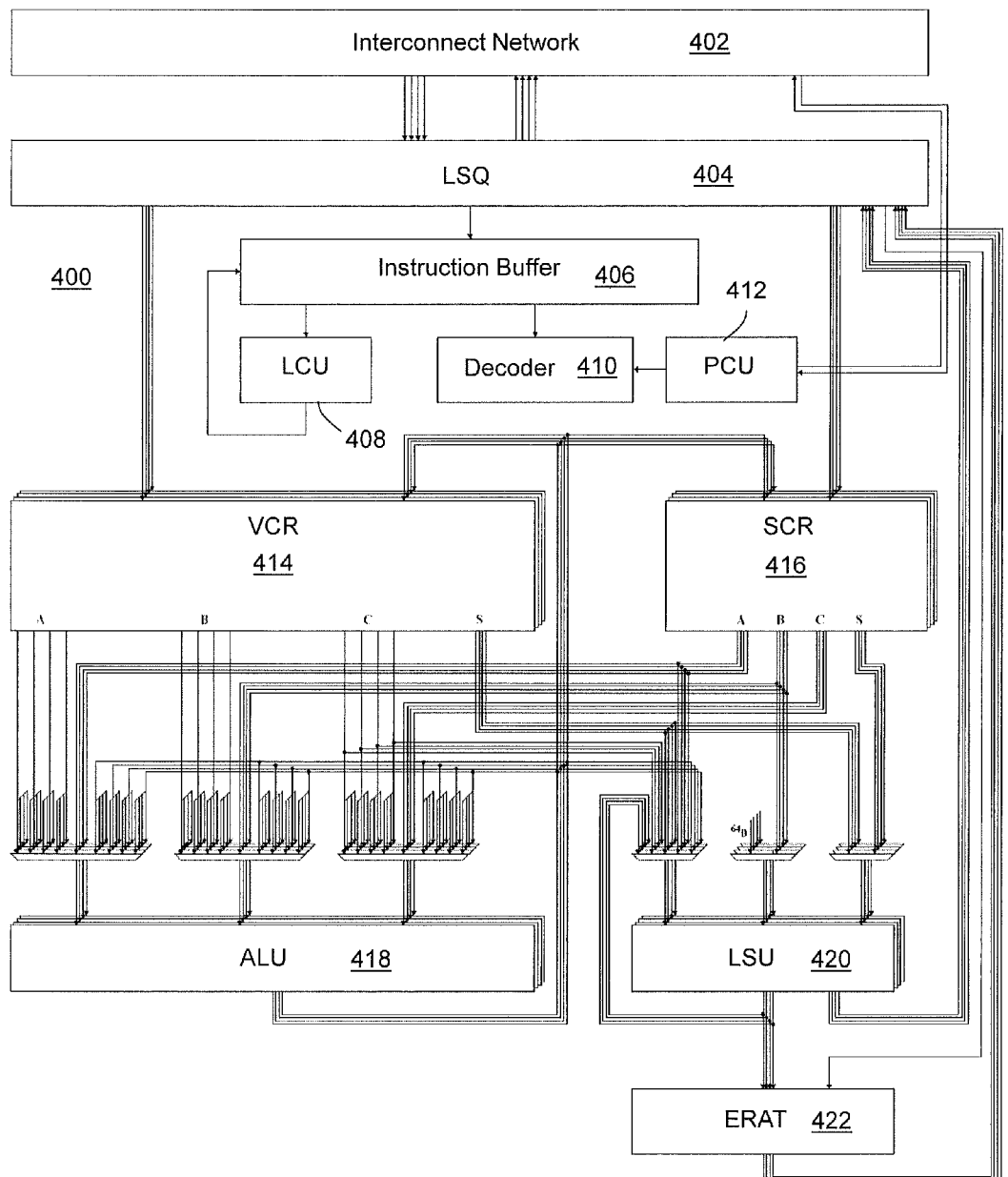
FIG. 4 illustrates a block diagram of a processing element in an active memory device in accordance with an embodiment.

FIG. 4 depicts an example of a processing element 400 coupled to an interconnect network 402 as an embodiment of one of the processing elements of FIGS. 1-3. The processing element 400, also referred to as exposed-pipeline processing element 400, can be situated in an active memory device, such as one of the active memory devices of FIGS. 1-3. The pipeline sequence of the processing element 400 is exposed such that a programmer or compiler can establish execution sequencing of low level instructions within the processing element 400. In the example of FIG. 4, the processing element 400 includes a load-store queue (LSQ) 404 coupled to the interconnect network 402 and to an instruction buffer 406. The instruction buffer 406 is also coupled to a lane control unit (LCU) 408 and a decoder 410. A processor communication unit (PCU) 412 provides a communication interface between the processing element 400 and the main processor or other processing elements through the interconnect network 402. The LSQ 404 is also coupled to a vector computation register file (VCR) 414 and a scalar computation register file (SCR) 416. The VCR 414 and SCR 416 are coupled through multiple multiplexers to an arithmetic logic unit (ALU) 418 and a memory-access unit 420, also referred to as a load-store unit (LSU) 420. The ALU 418 is coupled to itself and to the LSU 420 through multiplexers, and is also coupled to the VCR 414 and the SCR 416. The LSU 420 may also be coupled to itself, to the LSQ 404, to an effective-to-real address translation unit (ERAT) 422, to the VCR 414 and to the SCR 416 (all connections not depicted). The ERAT 422 is also coupled to the LSQ 404. As will be appreciated, numerous other connections and elements can be included in the processing element 400. For example, connections between the decoder 410 and other elements are not depicted for clarity. Additionally, depicted connections in FIG. 4 can be modified or omitted, such as the depicted connection between decoder 410 and PCU 412.

The processing element 400 supports an instruction set architecture including a broad range of arithmetic capabilities on many data types. Vector processing capabilities of the processing element 400 allows for single instruction, multiple data (SIMD) in time, while SIMD in a spatial dimension is also supported. The instruction buffer 406 holds instructions (also referred to as "lane instructions"), which are fetched and executed in order subject to branching.

In an embodiment, each lane instruction contains 9 sub-instructions for execution in various units within the processing element 400. An iteration count may be included within the lane instruction, allowing the sub-instructions to be repeated up to a predetermined number of times (e.g., up to 32 times). This facilitates SIMD in time. The LCU 408 can manage the iteration count and determine when to advance to a next instruction or repeat execution of the same instruction. In an embodiment, arithmetic pipelines of ALU 418 are 64 bits wide, and spatial SIMD is supported by virtue of the ability to execute data types smaller than 64 bits in parallel, simultaneously as multiple execution slots. For example, assuming that a lane instruction includes 9 sub-instructions, execution of the sub-instructions can be performed in the LCU 408 for lane control, and in four processing slices, each of which includes an ALU 418 and an LSU 420. Pairs of the VCR 414 and the SCR 416 can be implemented per processing slice and are accessible by each pair of the ALU 418 and LSU 420. Accordingly, the VCR 414, SCR 416, ALU 418, LSU 420, and associated multiplexers are depicted as stacks of four elements to indicate 4 processing slices in the example of FIG. 4.

At the processing slice level, computation can occur on floating-point and fixed-point data types at, for example, a 64-bit granularity in a temporal SIMD manner on 64-bit vector elements, and in a temporal and spatial SIMD manner on narrower vector sub-elements, which can be 32-bits, 16-bits, or 8-bits wide.

Each processing slice within the processing element 400 includes a memory access pipeline (load/store pipeline) and an arithmetic pipeline. Managing flow through the LSU 420 as a load/store pipeline can enable computation of one address per vector data element or sub-element. The processing element 400 provides the ability to perform associated fixed-point effective address (i.e., virtual address) computations. The arithmetic pipeline through the ALU 418 can include a robust assortment of floating-point and fixed-point operations to support a variety of workloads.

The LSU 420 may support load and store operations of, for example, 8, 4, 2 and 1 byte(s) and load and store operations of 4, 2, and 1 byte(s) to and from registers with packed data.

The ALU 418 may support copy operations between register files, arithmetic, rounding and conversion, comparison, and maximum and minimum operations on floating-point data types of double-precision (64 bits) and single-precision (32 bits), and arithmetic, rotate/shift, comparison, logical, count leading zeros, and ones population count operations on fixed-point data types of doubleword (64 bits), word (32 bits), halfword (16 bits) and bytes (8 bits).

In an embodiment, the computational model of a processing slice within the processing element 400 is a vector single instruction multiple data (SIMD) model with the VCR 414 and SCR 416. The VCR 414 can support multiple dimensions of registers, while the SCR 416 supports a single dimension of registers. For example, the VCR 414 can include 16 vector register entries with 32 elements each of 64 bits, and the SCR 416 can include 16 register entries with 1 element each of 64 bits, although numerous other configurations may be supported. A variable number of execution slots can be used, operating on an equal number of sub-elements, whereby the sub-elements taken together add up to one register element (either VCR 414 or SCR 416) of 64 bits in this example. The number of execution slots and the corresponding number of vector sub-elements depend upon the data type of the instruction. Examples of data types and sizes of various formats include: floating-point with double-precision (64-bit) and single-precision (32-bit) data types and fixed-point for a doubleword (64-bit), word (32-bit), halfword (16-bit), and byte (8-bit) data types.

Figure 5:
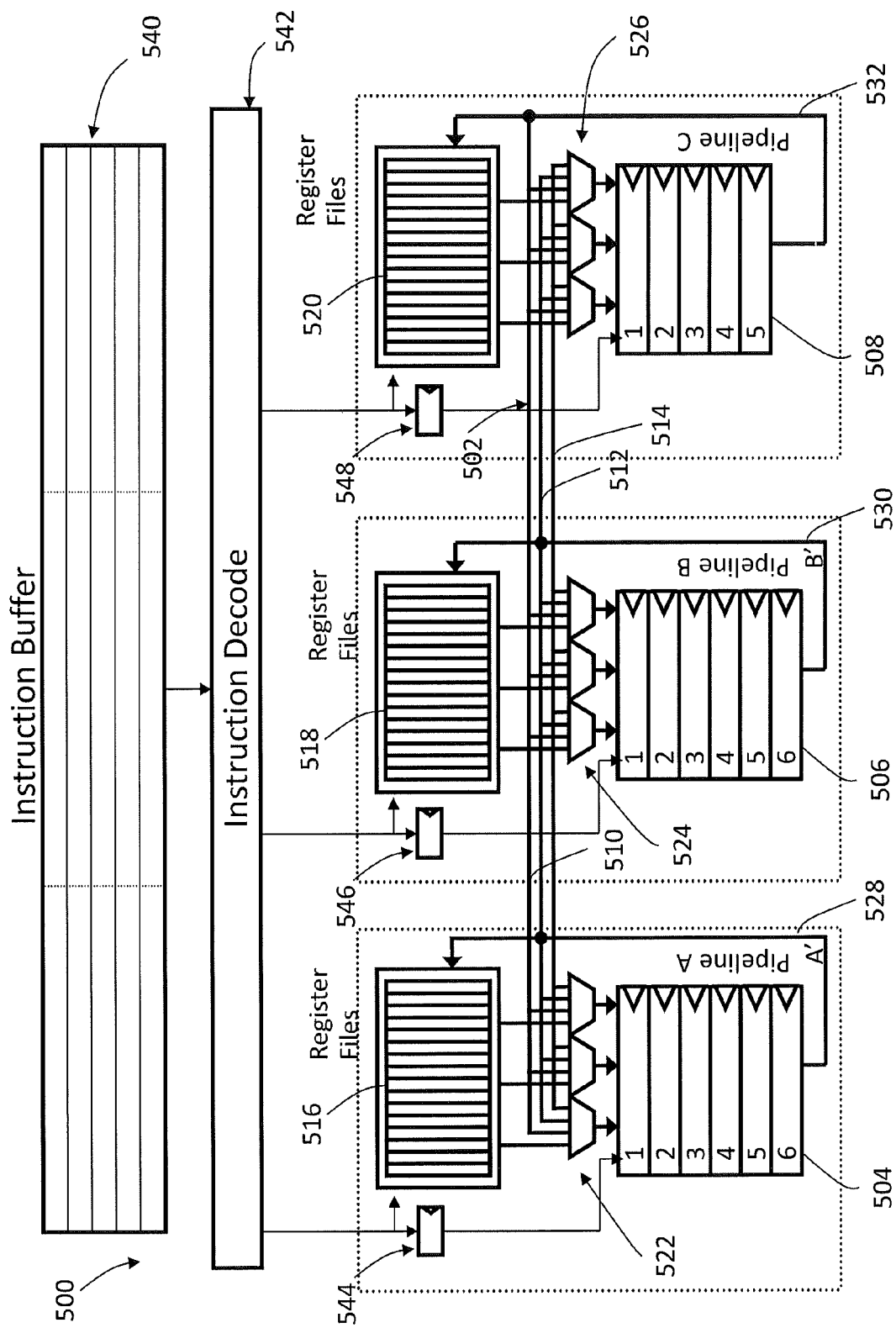
FIG. 5 illustrates a diagram of a processing element in an active memory device in accordance with an embodiment.

FIG. 5 is a schematic diagram of an exemplary processing element 500 having a chaining bus 502 to provide communication of operands between pipelines. The processing element 500 includes a first pipeline 504, a second pipeline 506 and a third pipeline 508. In an embodiment, the pipelines 504, 506, 508 each have six stages, where the pipelines represent exposed pipelines of the ALU 418 of FIG. 4. In another embodiment, the pipelines 504, 506, 508 represent exposed pipelines of the LSU 420 of FIG. 4. In an embodiment, the pipelines may receive instructions from an instruction buffer, where separate sub-instructions are provided to each of the pipelines. A result of an instruction performed in the first pipeline 504 may be supplied as an operand to the second pipeline 506 via the chaining bus 502. In an embodiment described in detail in FIG. 6, a compiler separates a multiple instruction word into a plurality of sub-instructions, where each of the sub-instructions is to be executed on a separate pipeline. The compiler also provides for a shift or delay in performance of one or more selected sub-instructions that have dependencies on a result from another sub-instruction. In an embodiment, no operation instructions ("nops") are performed during a first clock cycle by a pipeline that has a sub-instruction that requires a result from another sub-instruction as an operand to execute. Thus, in an embodiment, an instruction buffer 540 holds the instructions for each pipeline for each time in a cycle (e.g., corresponding to the inputs for each execution of the sub-instruction), where the instructions for the delayed pipelines are no operation instructions. In embodiments, a multiple instruction word (MIW, e.g. a horizontal microcoded instruction) is fetched from the Instruction Buffer 540 and decoded in Instruction Decode logic 542

Figure 7:
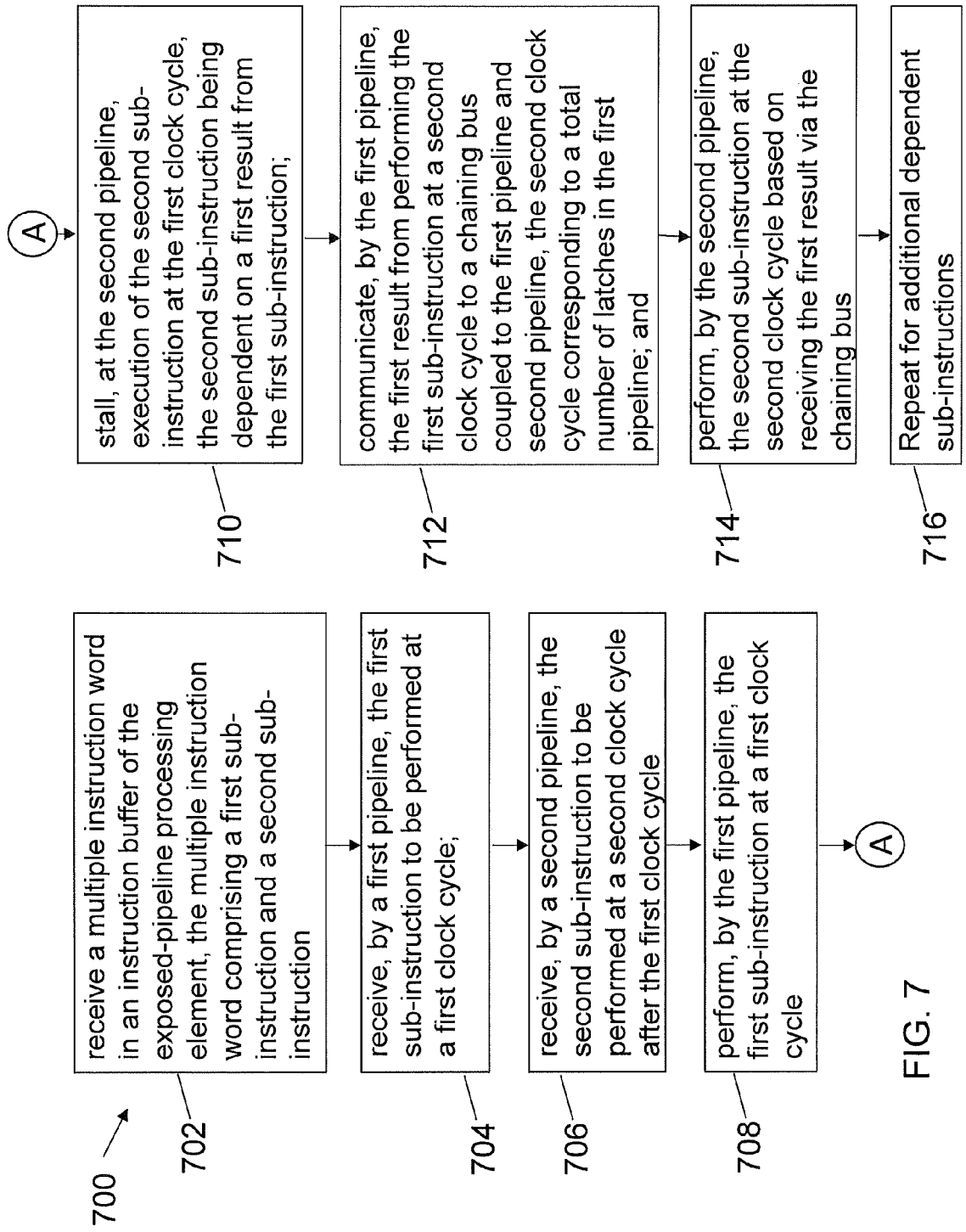
FIG. 7 illustrates a flow chart of a method for chaining data between pipelines in accordance with an embodiment.

In another embodiment shown in FIG. 7, the instruction buffer holds the entire multiple sub-instruction word, where hardware before the stages of each pipeline stall a sub-instruction that is dependent on a result from another sub-instruction. The stalled sub-instruction has a field (e.g., bits in the sub-instruction) that indicate the sub-instruction requires an input from another sub-instruction to proceed, thus causing a stall in the hardware that waits for execution until the operand is present on the chaining bus 502. In one embodiment, the first sub-instruction performing in the first pipeline has a destination field indicating a location of a second pipeline that will receive the result of the first sub-instruction as an input for a second sub-instruction that is dependent on the first sub-instruction. In addition, the second sub-instruction has a source field indicating the second sub-instruction has an input of the result from the first instruction performed on the first pipeline. In an embodiment, the sub-instructions may stall at or near muxes 522, 524, 526 for each of the pipelines 504, 506, 508, respectively. Each embodiment of the exposed vector pipeline utilizes communication of the operands over the chaining bus 502 for execution of dependent sub-instructions. The chaining bus 502 may include as many communication lines as necessary. As depicted, the processing element 500 has three pipelines and the chaining bus 502 has three corresponding chaining bus lines 510, 512, 514.

In one embodiment, the first pipeline 504 executes a first sub-instruction at a first time cycle, where a second sub-instruction that is to be performed by the second pipeline is dependent on a result of the first sub-instruction. Accordingly, after the first result (e.g., A') is provided by a communication line 528 to the chaining bus 502, the second sub-instruction is executed by the second pipeline 506 at a second time cycle. The second pipeline 506 may perform a no operation instruction at the first time cycle and then perform the second sub-instruction at the second time cycle when the first result is available on the chaining bus 502. In an embodiment, the first result is provided via communication line 528 to the chaining bus 502 and a first register file 516. Similarly, the second sub-instruction may be performed by the second pipeline 506 and produce a second result that is provided by a communication line 530 to the chaining bus 502 and a second register file 518. The second result from the second sub-instruction may be used as an operand of a third sub-instruction that is performed by the third pipeline 508 at a third time cycle. As discussed herein, the first time cycle occurs before the second time cycle and the second time cycle occurs before the third time cycle. In an embodiment, the third sub-instruction may be performed by the third pipeline 508 and produce a third result that is provided by a communication line 532 to the chaining bus 502 and a third register file 520. The result(s) of performance of the sub-instructions may be provided to register files for use in a program or operation. The processing element 500 may have any suitable number of pipelines with dependent sub-instructions that use one or more results provided via a chaining bus 502.

Figure 6:
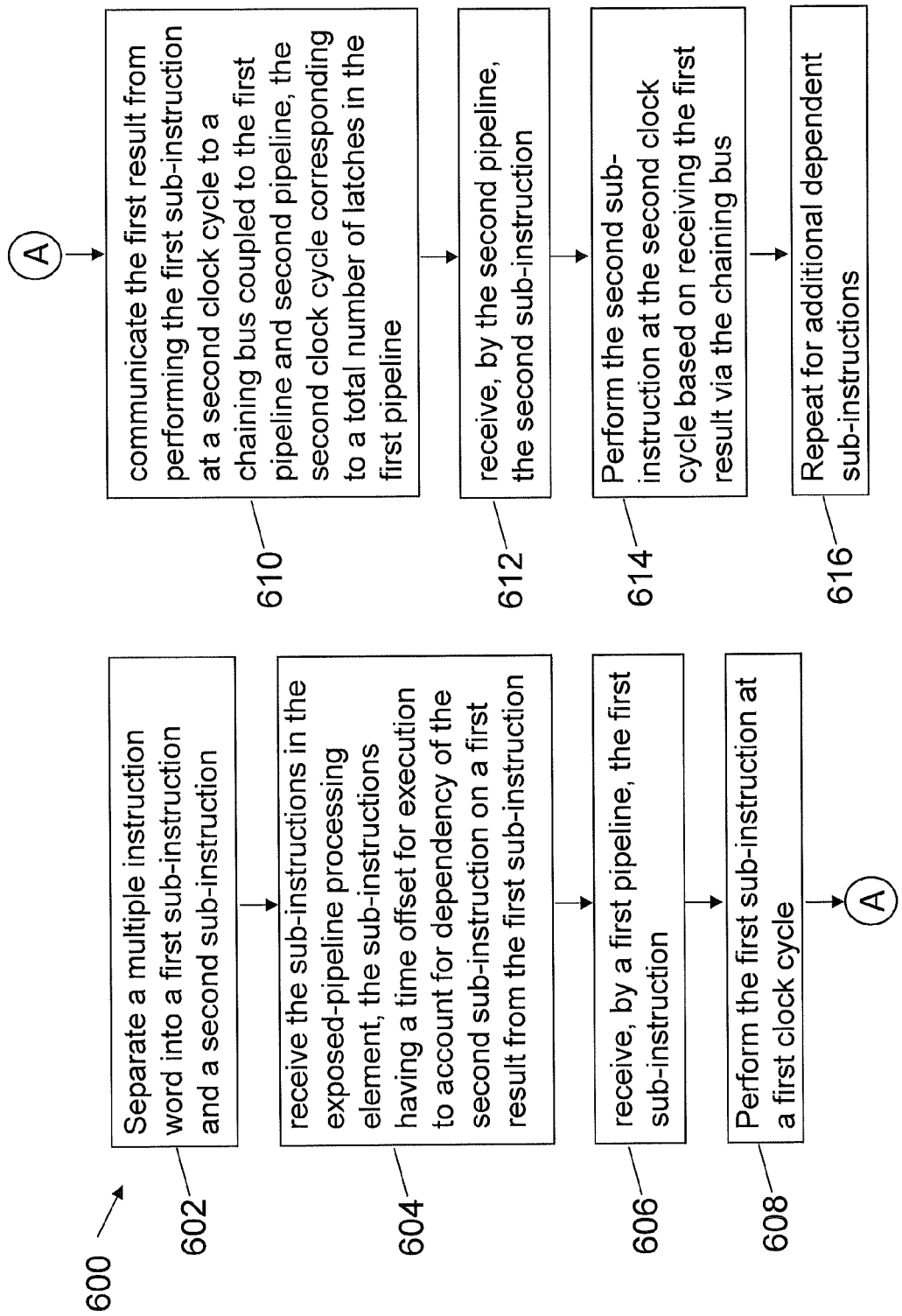
FIG. 6 illustrates a flow chart of a method for chaining data between pipelines in accordance with an embodiment.

FIG. 6 is a flow chart 600 of an exemplary method, computer program product and system for chaining data in an exposed pipeline processing element. In block 602, a multiple instruction word is separated into a first sub-instruction and a second sub-instruction. In an embodiment, the compiler separates the multiple instruction word into a plurality of sub-instructions, where one or more sub-instruction is dependent upon a result of one sub-instruction. In block 604, the first sub-instruction and the second sub-instruction are received in the exposed-pipeline processing element, where the first sub-instruction and second sub-instruction are issued with a time offset for execution to account for dependency of the second sub-instruction on a first result from the first sub-instruction. In block 606, a first pipeline receives the first sub-instruction. In block 608, the first pipeline performs the first sub-instruction at a first clock cycle. In block 610, the first pipeline communicates the first result from performing the first sub-instruction at a second clock cycle to a chaining bus coupled to the first pipeline and second pipeline, where the second clock cycle corresponds to a total number of latch pipeline stages in the first pipeline. In block 612, the second pipeline receives the second sub-instruction at the second clock cycle, the second clock cycle being after the first clock cycle. In block 614, the second pipeline performs the second sub-instruction at the second clock cycle based on receiving the first result via the chaining bus. In block 616, the process of performing a sub-instruction to provide an operand for a dependent sub-instruction via a chaining bus, similar to steps 604 to 614 may be repeated for the second sub-instruction (producing a result or operand) and a third sub-instruction (dependent on the result) that is performed on a third pipeline. In an embodiment, a compiler receives the multiple instruction word and inserts "nops" as instructions for a pipeline that is dependent on other pipeline results for performance of sub-instructions. Thus, while a first sub-instruction is performing on a first pipeline at a first clock cycle, the second pipeline is performing a nop during the first clock cycle. Later, such as at a second clock cycle, the second pipeline receives the result of the first sub-instruction and performs the second sub-instruction (instead of a nop). Further, the first sub-instruction may still be performed at the first pipeline at the second clock cycle, where an index counts to a second element input from the vector register for performance of the first instruction again by the first pipeline. The result of the first instruction on the second input is then communicated via chaining bus 502 or "chained" at a third clock cycle to the second pipeline where the result is used in performing the second sub-instruction on a second index.

It should be noted that the chaining methods and systems described herein (e.g., FIGS. 6 and 7) are performed in systems with two pipelines in separate register file spaces. The separate register file spaces mean that, in embodiments without the chaining mechanism, a first pipeline will not have access to write to a second pipeline's register file and vice-versa (i.e., the two pipelines cannot access each other's datasets). In embodiments utilizing the chaining mechanism, results data is directly communicated to another pipeline via a chaining bus and does not necessarily have the data written to a file location, thus improving execution speed for instructions. For the embodiments with separate register file spaces, result data is provided by a pipeline to another pipeline that would ordinary not have access to the results via a common register. In some embodiments with pipelines in separate register file spaces, the pipelines can only perform a read function for a register file associated with a pipeline in a different register file space. Thus, the chaining mechanism allows data to be provided between pipelines that cannot write data to a separate register file space.

FIG. 7 is a flow chart 700 of an exemplary method, computer program product and system for chaining data in an exposed pipeline processing element. In block 702, a multiple instruction is received in an instruction buffer of the exposed-pipeline processing element, where the multiple instruction word comprising a first sub-instruction and a second sub-instruction. In block 704, the first pipeline receives the first sub-instruction to be performed at a first clock cycle. In block 706, the second pipeline receives the second sub-instruction to be performed at a second clock cycle after the first clock cycle. In block 708, the first pipeline performs the first sub-instruction at a first clock cycle. In block 710, execution of the second sub-instruction at the first clock cycle is stalled, where the second sub-instruction is dependent on a first result from the first sub-instruction. When a sub-instruction is stalled at a pipeline, the pipeline does not perform an instruction during the clock cycle for which it is stalled. The second sub-instruction may be stalled at the second pipeline or before the second pipeline (e.g., in the latches either following a first latch stage of 504, 506, 508 or preceding 544, 546, 548 the mux before the pipeline). The stall can be implemented by clock gating the latches such that they hold their current state until the pipeline is un-stalled (removed from the stalled state). In block 712, the first pipeline communicates the first result from performing the first sub-instruction at a second clock cycle to a chaining bus coupled to the first pipeline and second pipeline, where the second clock cycle corresponds to a total number of latch pipeline stages in the first pipeline. In block 714, the second pipeline performs the second sub-instruction at the second clock cycle based on receiving the first result via the chaining bus. In block 716, the process of performing a sub-instruction to provide an operand for a dependent sub-instruction via a chaining bus, similar to steps 704 to 714 may be repeated for the second sub-instruction (producing a result or operand) and a third sub-instruction (dependent on the result) that is performed on a third pipeline.

Figure 8:
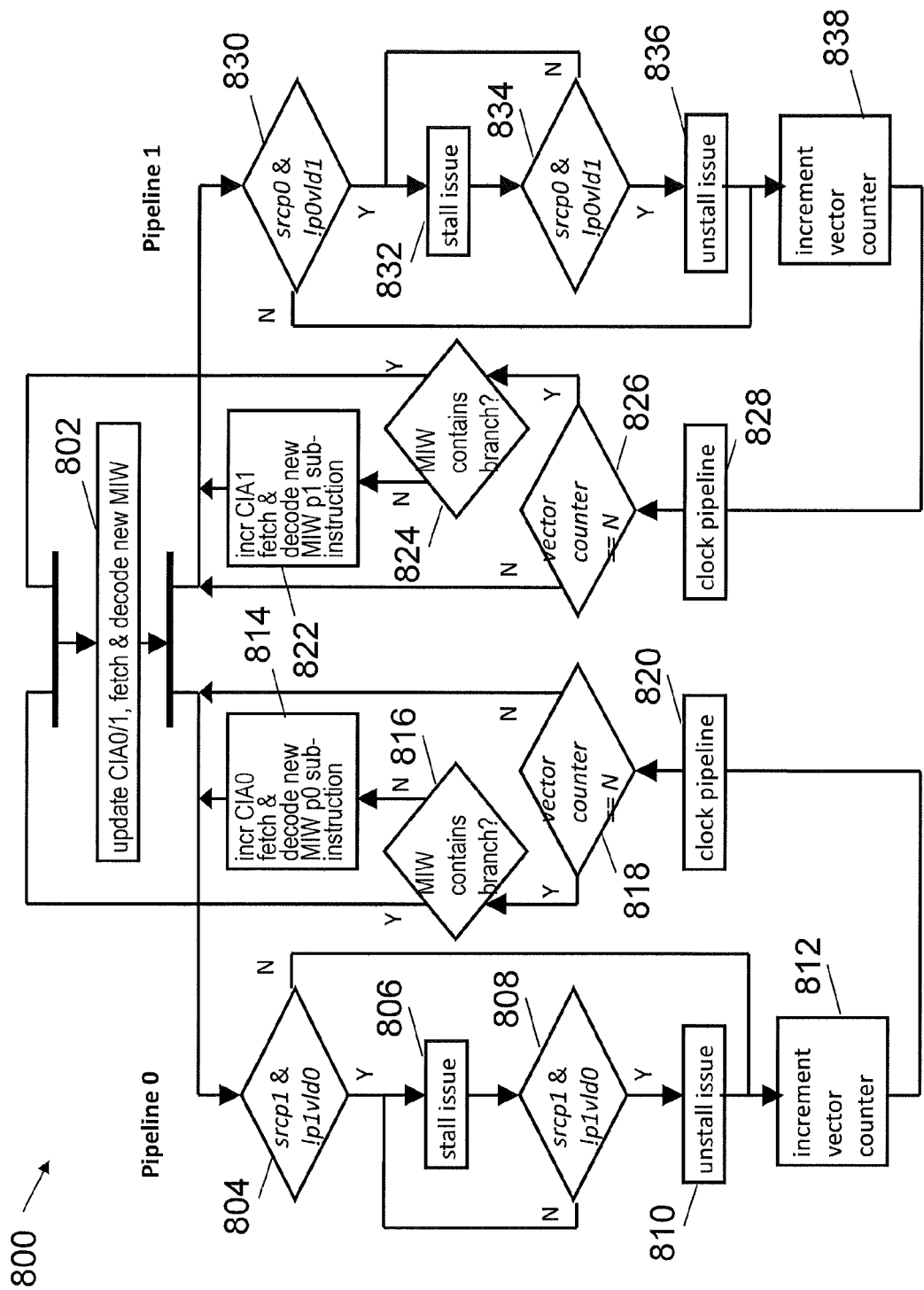
FIG. 8 illustrates a diagram of a logic operation for chaining data between pipelines in accordance with an embodiment.

FIG. 8 is an exemplary diagram of a logic operation 800 in hardware that performs a method of chaining data in an exposed pipeline processing element. The program executing on the processing element starts in block 802 where a first multiple instruction word (MIW) is fetched from Instruction Buffer 540 and decoded in Instruction Decode logic 542. In an embodiment, a MIW is a horizontal microcoded instruction. The first MIW contains two sub-instructions, a first sub-instruction for execution in pipeline 0 and a second sub-instruction for execution in pipeline 1 . The sub-instructions each contain a source and destination field that indicates if and to which pipeline their result should be chained. Once pipeline 0 receives the first sub-instruction (in latch 544) it checks in block 804 if any of its source operands corresponds to the result of the second sub-instruction that is to be executed in pipeline 1 . The check in block 804 is performed by looking at the source field (scrp 1) of the sub-instruction. If a source operand of the first sub-instruction corresponds to the result of the second sub-instruction, pipeline 0 stalls the issue of the first sub-instruction in block 806 until the result from the second sub-instruction is available (indicated by the p 1 vld0 signal being set to a logic '1'). Once the result of the second sub-instruction is available on the chaining bus 502, this is detected in block 808 and pipeline 0 un-stalls and issues the first sub-instruction to pipeline stage 1 of pipeline 504, and increments its vector iteration counter in block 812. Pipeline 0 proceeds to be clocked in block 820 and a check is made in block 818 if the vector index counter equals the number of iterations specified in the first MIW. If not all iterations have been performed, the condition in block 804 is checked to see if the next iteration of the first sub-instruction can be issued to pipeline 0 with the next vector element index of the source operands, or if pipeline 0 needs to be stalled due to a dependency on the result of the second iteration of the second sub-instruction. The described sequence of steps are repeated for the number of iterations specified by the first MIW. After it is detected in block 818 that all iterations of the first sub-instruction have completed, it is checked in block 816 if the first MIW contains a branch instruction, and if so, the processing element will wait for all pipelines to finish executing all iterations of their sub-instructions before fetching a second MIW in block 802. If the first MIW does not contain a branch instruction, then pipeline 0 is free to fetch and decode a third sub-instruction from the second MIW in the instruction buffer 540 without waiting for pipeline 1 to finish executing its current sub-instruction. Similarly, if the first MIW does not contain a branch instruction, once the second sub-instruction has finished all its iterations, pipeline 1 is free to fetch and decode a fourth sub-instruction from the second MIW in the instruction buffer 540 without waiting for pipeline 0 to finish executing all iterations of its current sub-instruction. The execution of sub-instructions in the pipelines can thus proceed asynchronously between branches and the execution is only synchronized when there is a dependency between the sub-instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for chaining data in an exposed-pipeline processing element, the system comprising:
a first pipeline and a second pipeline located in separate register file spaces, the system configured to perform a method comprising:
separating a multiple instruction word into a first sub-instruction and a second sub-instruction;
receiving the first sub-instruction and the second sub-instruction in the exposed-pipeline processing element;
issuing the first sub-instruction at a first time;
issuing the second sub-instruction at a second time different than the first time, the second time being offset to account for a dependency of the second sub-instruction on a first result from the first sub-instruction;
performing, by a first pipeline, the first sub-instruction at a first clock cycle;
communicating, by the first pipeline, the first result from performing the first sub-instruction to a chaining bus coupled to the first pipeline and a second pipeline, the communicating at a second clock cycle subsequent to the first clock cycle that corresponds to a total number of latch pipeline stages in the first pipeline, the first pipeline and second pipeline being located in separate register file spaces;
receiving, by the second pipeline, the second sub-instruction at the second clock cycle; and
performing, by the second pipeline, the second sub-instruction at the second clock cycle, the performing based on receiving the first result via the chaining bus.

2. The system of claim 1, wherein separating the multiple instruction word into the first sub-instruction and the second sub-instruction further comprises separating, by a compiler, the multiple instruction word into the first sub-instruction and the second sub-instruction.

3. The system of claim 2, wherein separating the multiple instruction word into the first sub-instruction and the second sub-instruction further comprises inserting a no operation instruction for the second pipeline to execute at the first clock cycle before the second pipeline executes the second sub-instruction at the second clock cycle and wherein the first pipeline performs a second index of the first sub-instruction during the second clock cycle.

4. The system of claim 1, wherein issuing the first sub-instruction comprises receiving a sub-instruction with a destination field indicating the second pipeline as having an input of the first result of the first sub-instruction.

5. The system of claim 4, wherein issuing the second sub-instruction comprises receiving a sub-instruction with a source field indicating the second sub-instruction has an input of the first result from the first pipeline.

6. The system of claim 1, wherein separating the multiple instruction word further comprises separating the multiple instruction word into the first sub-instruction, the second sub-instruction and a third sub-instruction; and
the method further comprising:
communicating, by the second pipeline, a second result from performing the second sub-instruction at a third clock cycle to the chaining bus coupled to a third pipeline, the third clock cycle corresponding to a total number of latch pipeline stages in the second pipeline;
receiving the third sub-instruction at the third clock cycle, the third clock cycle being subsequent to the second clock cycle; and
performing, by the third pipeline, the third sub-instruction based on receiving the second result via the chaining bus.

7. The system of claim 1, wherein separating the multiple instruction word further comprises separating the multiple instruction word into the first sub-instruction, the second sub-instruction and a third sub-instruction;

the method further comprising:

receiving the third sub-instruction at a third clock cycle, the third clock cycle being after the first clock cycle and before the second clock cycle;

performing, by a third pipeline, the third sub-instruction;

communicating, by the third pipeline, a second result from performing the third sub-instruction at a third clock cycle to the chaining bus coupled to the third pipeline, the third clock cycle corresponding to a total number of latch pipeline stages in the third pipeline; and wherein performing, by the second pipeline, the second sub-instruction based on receiving the first result via the chaining bus further comprises performing the second sub-instruction based on receiving the first result and second result via the chaining bus.

8. A system for chaining data in an exposed-pipeline processing element, the system comprising:

an instruction buffer, a first pipeline and a second pipeline located in separate register file spaces, the system configured to perform a method comprising:

receiving a multiple instruction word in an instruction buffer of the exposed-pipeline processing element, the multiple instruction word comprising a first sub-instruction and a second sub-instruction;

receiving, by a first pipeline, the first sub-instruction;

receiving, by a second pipeline, the second sub-instruction, the first pipeline and second pipeline being located in separate register file spaces;

performing, by the first pipeline, the first sub-instruction at a first clock cycle;

stalling execution of the second sub-instruction at the first clock cycle, the second sub-instruction being dependent on a first result from the first sub-instruction;

communicating, by the first pipeline, the first result from performing the first sub-instruction to a chaining bus coupled to the first pipeline and second pipeline, the communicating at a second clock cycle subsequent to the first clock cycle that corresponds to a total number of latch pipeline stages in the first pipeline; and performing, by the second pipeline, the second sub-instruction at the second clock cycle, the performing based on receiving the first result via the chaining bus.

9. The system of claim 8, wherein the second sub-instruction comprises a source field indicating that the second sub-instruction has the first result as an operand, wherein the second pipeline stalls execution of the second sub-instruction based on reading the source field.

10. The system of claim 9, wherein the first sub-instruction comprises a destination field indicating that the second pipeline is to receive the first result on the chaining bus.

11. The system of claim 8, wherein the second pipeline does not perform any instruction during the first clock cycle.

12. The system of claim 8, wherein the first pipeline performs a second index of the first sub-instruction during the second clock cycle.

* * * * *